July 24, 1962  K. E. HUMBERT, JR., ETAL  3,045,928
COUPLINGS
Original Filed Jan. 10, 1955
FIG.1
FIG.4
FIG.3
FIG.2
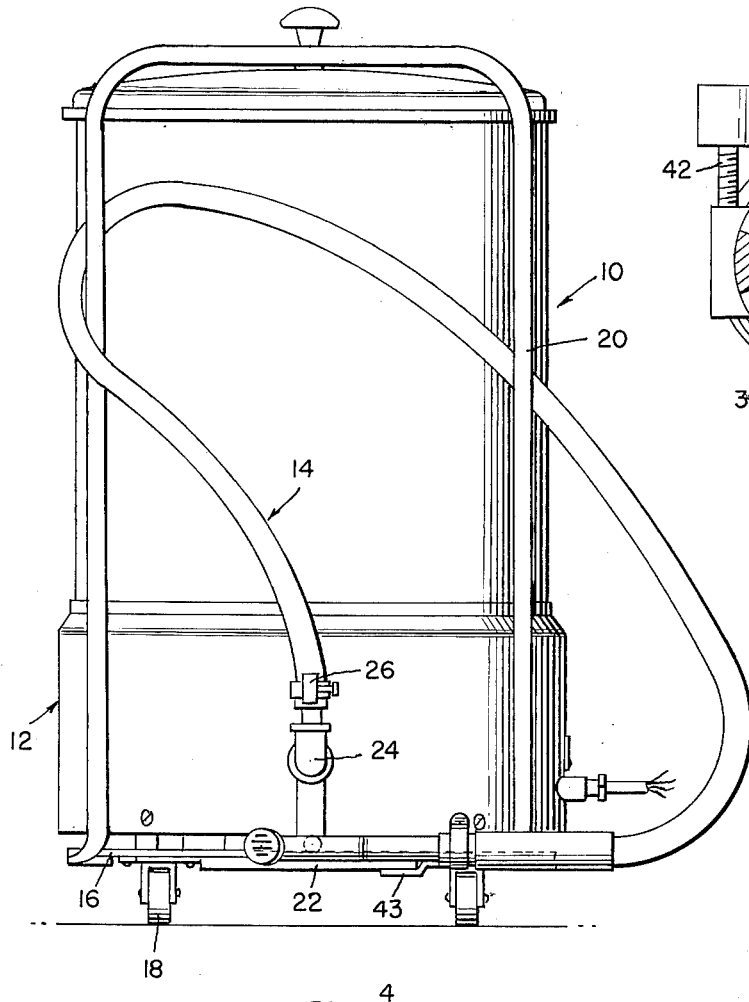
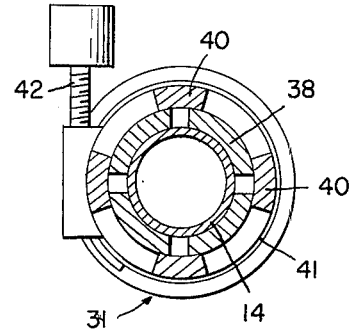
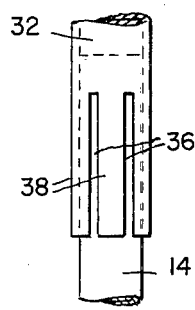
INVENTORS
Kingsley E. Humbert, Jr.
Ralph L. Young
Lewis M. Hough, Jr.
BY *Shoemaker + Mattare*
ATTORNEYS

United States Patent Office 3,045,928
Patented July 24, 1962

3,045,928
COUPLINGS
Kingsley E. Humbert, Jr., Ralph L. Young, and Lewis M. Hough, Jr., all of Gastonia, N.C., assignors to Wix Corporation, Gastonia, N.C., a corporation of North Carolina
Original application Jan. 10, 1955, Ser. No. 480,826. Divided and this application Dec. 9, 1958, Ser. No. 779,215
3 Claims.  (Cl. 239—530)

This invention relates generally to improvements in couplings for tubular bodies and more especially to a new and novel coupling designed for establishing a connection between a hose and another tubular member such as a metal nozzle.

The present application is a division of our application Serial No. 480,826, filed January 10, 1955, now Patent No. 2,902,161.

The present invention as disclosed in the parent application is used in association with a portable filter apparatus and while it is of particular value in connection with such apparatus, it may have general application wherever a situation requires the establishment of a coupling between a flexible and a rigid tube.

In our prior application, of which the present one is a division, there is disclosed a portable filtering apparatus designed especially for use in business establishments where, as in restaurants, for example, oils or other liquids are made use of in cooking processes which, after a period of use, may accumulate certain contaminants which, if removed, will restore the oil or other liquid to the former usable condition and thereby extend the use of the same liquid over a long period of time, whereas, if no suitable means were employed for regenerating or cleansing the liquid, its useful life would be materially shortened.

In the filter apparatus disclosed in the patent application, provision is made for taking off oils from receptacles, while the oil is hot, and running it through a filter and then returning it to the receptacle for use. This is particularly important where such oils may be used in restaurants, for example, for deep fat frying, and by providing a means for cleansing the oil while it is in heated condition it will be seen that considerable time and fuel will be saved because of the fact that it does not become necessary to allow the oil to cool down before it is filtered.

The apparatus referred to employs a flexible tube or hose by which the headed oil is drawn off from the receptacle, carried to the filter, filtered and then returned to the cooking receptacle by the same hose. Such hose includes at the free end thereof a rigid nozzle which is secured to the hose and there is employed also an insulation handle encircling the hose at the point of joinder with the nozzle whereby the hot liquid can be passed through the hose and nozzle without discomfort to the person holding the hose.

An object of the present invention is to provide a new and novel coupling means for securing the nozzle to the hose whereby a tight or firm leak-proof connection is established.

It is another object of the invention to provide an insulation handle designed for attachment to the hose at the end thereof which is connected to the nozzle whereby the hose and nozzle can be comfortably handled while hot liquids are passing therethrough and a particularly novel feature of the handle resides in the manner in which it is firmly secured to the hose and nozzle.

More particularly it is an object of the invention to provide in a nozzle and hose coupling a novel means associated with and forming a part of a handle whereby the hose and nozzle may be firmly clamped together to form a leakproof coupling and whereby further such clamping action includes a part of the handle structure to firmly fix the handle in place or against movement on the hose and the end portion of the nozzle attached thereto.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

FIG. 1 is a view in elevation of the portable filter apparatus disclosed in the parent application and showing operatively connected with the apparatus a hose to the end of which is secured a nozzle and handle by means of a coupling constructed in accordance with the present invention;

FIG. 2 is a view in side elevation on an enlarged scale showing a portion of the hose, the nozzle, handle and coupling means between the three;

FIG. 3 is a view in elevation of the connection between the ends of the nozzle and hose, with the handle removed;

FIG. 4 is a sectional view on an enlarged scale from that of FIG. 2, taken substantially on the line 4—4 of FIG. 2.

Referring now more particularly to the drawing, the numeral 10 generally designates the filter enclosing receptacle forming a part of the filtering apparatus hereinbefore referred to, which receptacle houses a filter unit and beneath the same within the skirt 12 is housed pumping apparatus and valve mechanism for effecting the withdrawal from a container of fluid which is to be filtered, passing it through the filter in the receptacle and returning it in filtered condition to the container, such withdrawal from the container and return of the fluid being by way of the single hose 14.

No showing of any of the apparatus within the receptacle 10 and within the lower skirt portion 12 thereof is here given since no part of the same is embodied in the claims of this divisional application, but the illustration and preceding description is given, together with some of the following description, merely for the purpose of illustrating the initial use of the hose and associated coupling, but it is to be understood that this illustration and description are not intended to in any way limit the use of the invention as defined by the appended claims.

The apparatus shown in FIG. 1 is mounted upon a base 16 supported by suitable wheels or rollers 18 and having connected therewith a handle frame 20 for manipulating or effecting the desired movements of the apparatus.

The base plate also includes or carries an extension portion 22 which serves as a means, as hereinafter described, for attaching the hose nozzle to the base to hold the same out of the way while the apparatus is being moved.

The numeral 24 designates a pipe coupling leading from a valve unit within the skirt 12 and to which an end of the hose 14 is secured by a clamp 26 of conventional type.

The other or opposite end of the hose 14 has joined thereto the metal nozzle which is generally designated 28, by means of the present improved novel coupling which is generally designated 30 and which coupling includes a handle generally designated 31.

The nozzle 28 constitutes a short length of metal tubing designated 32 which is here shown as bent slightly intermediate its ends so that the head 34 attached to one end of the tube 32 will be directed at an oblique angle from the rear end portion of the tube which is attached to the hose 14. However, it will be clearly apparent that in the employment of the novel coupling for securing the rear end of the nozzle tube 32 to the hose 14, it is not essential that the nozzle be of an angled form but may be straight, if desired.

The rear end portion of the nozzle tube, that is the end opposite from that to which the nozzle head 34 is attached, in its formation comprises an element of the coupling structure and as such, it is slotted longitudinally through a portion of its length and along several lines around its circumference, as indicated at 36, so as to form the rear end of the nozzle tube with the plurality of flexible fingers 38. The outer end of the hose is inserted into the slotted end of the nozzle tube as shown in FIG. 3, preferably to a sufficient extent to terminate slightly beyond the inner ends of the slots 36.

The handle 31 comprises a tubular or sleeve body 39 of an inside diameter to receive the hose 14 so that the end of the hose which is attached to the nozzle tube is encased in the handle and the forward end portion of the handle receives the fingers 38 of the tube 32, as illustrated in FIG. 2. The handle body is formed preferably of a material having insulating qualities, such as wood or any other material having the desired characteristics.

The forward end of the sleeve body forming the handle 31 is formed to provide, or has attached thereto, a circular series of forwardly extending flexible clamping or gripping fingers 40 and these fingers, which are in spaced relation in a manner similar to the spacing of the fingers 38, are disposed around the fingers 38.

Encircling the series of forwardly extending clamping fingers 40 which form a part of or are carried by the handle body 39 is a clamping band 41 which is preferably of the type in which a screw means 42 forms a part which couples together overlapping ends of the band and by means of which one end of the band may be drawn into overlapping relation with the other end so as to contract the band and thus produce a squeezing action against and around the clamping fingers 40 and the fingers 38, compressing the latter fingers onto tight clamping engagement with the hose 14, as illustrated.

It will be seen from the foregoing that there is provided a combined handle and coupling for establishing a desired tight connection between the hose end and the nozzle end and at the same time there is provided a secure connection between the insulation handle and the adjacent telescopically engaged ends of the hose and nozzle so that the handle is securely held against movement on the nozzle and hose.

The numeral 43 designates a tongue member which is offset through a portion of its length from the body of the nozzle tube 32 and has a short portion at one end fixed to the nozzle body, as indicated at 43a. This tongue has its free end directed toward the forward end of the nozzle and it is spaced from the body of the nozzle or nozzle tube so as to snugly receive in the space an edge of the plate 22 which is carried by the base 16.

When the apparatus is moved about, the hose is placed around the handle 20 and the nozzle is attached to and rests upon the plate 22 where it is held in position and out of the way by the attaching tongue 43.

From the foregoing it will be apparent that there is provided by the present invention a new and novel coupling and a new and novel construction in a combined hose, nozzle and handle unit whereby not only is there obtained a very effective leak-proof coupling between the hose and nozzle, but there is obtained a firm connection between the handle body and the other parts which holds the handle body against movement, but at the same time the entire coupling can be easily and quickly broken down to facilitate the separation of the several parts for cleaning or other purposes.

The nozzle head 34 may be of any desired form, but preferably, where it is employed for use in association with a filter apparatus of the character desecribed, it is in the form of a slotted strainer cap whereby in the operation of drawing off liquid from a container where such liquid may have large free particles therein, such particles will be prevented from entering the hose and passing into the filtering receptacle.

We claim:

1. A combination comprising a hollow handle, a tubular nozzle and a flexible hose, said handle having a plurality of longitudinally extending space fingers adjacent one end thereof, said nozzle having a plurality of longitudinally extending spaced fingers adjacent one end thereof, said nozzle extending into said handle so said handle fingers are disposed over and around said nozzle fingers, said flexible hose extending completely through said handle and into said nozzle beyond said nozzle fingers, and a split ring clamp means disposed around the outside of said handle fingers where said handle fingers are disposed over said nozzle fingers for clamping said handle and nozzle fingers and hose together in a liquid tight relationship.

2. The combination of claim 1 wherein said handle fingers are disposed over said nozzle fingers to cover the spaces between said nozzle fingers.

3. The combination of claim 1 wherein said handle and nozzle fingers are oppositely disposed on said respective adjacent ends.

References Cited in the file of this patent

UNITED STATES PATENTS

| | | |
|---|---|---|
| 708,538 | Esch | Sept. 9, 1902 |
| 1,139,797 | Peffers | May 18, 1915 |
| 1,468,707 | Johnston | Sept. 25, 1923 |

FOREIGN PATENTS

| | | |
|---|---|---|
| 23,725 | Australia | July 27, 1935 |
| 305,014 | Italy | Jan. 24, 1933 |
| 378,340 | Great Britain | Aug. 11, 1932 |
| 727,061 | France | Mar. 15, 1932 |